United States Patent
Gao et al.

(10) Patent No.: US 12,100,064 B2
(45) Date of Patent: Sep. 24, 2024

(54) WARP EXECUTION METHOD AND ASSOCIATED GPU

(71) Applicant: ALIBABA (CHINA) CO., LTD., Zhejiang Province (CN)

(72) Inventors: Yuan Gao, Shanghai (CN); Fei Sun, San Jose, CA (US); Haoran Li, Shanghai (CN); Guyue Huang, Shanghai (CN); Chen Zhang, Shanghai (CN); Ruiguang Zhong, Shanghai (CN)

(73) Assignee: ALIBABA (CHINA) CO., LTD., Zhejiang Province (CN)

( * ) Notice: Subject to any disclaimer, the term of this patent is extended or adjusted under 35 U.S.C. 154(b) by 86 days.

(21) Appl. No.: 18/046,097

(22) Filed: Oct. 12, 2022

(65) Prior Publication Data
US 2023/0394617 A1 Dec. 7, 2023

(30) Foreign Application Priority Data
Jun. 6, 2022 (CN) .......................... 202210627993.X

(51) Int. Cl.
*G06T 1/60* (2006.01)
*G06T 1/20* (2006.01)

(52) U.S. Cl.
CPC . *G06T 1/60* (2013.01); *G06T 1/20* (2013.01)

(58) Field of Classification Search
CPC ....... G06F 9/3851; G06F 9/3888; G06T 1/20; G06T 1/60
See application file for complete search history.

(56) References Cited

U.S. PATENT DOCUMENTS

| 8,769,510 | B2 * | 7/2014 | Martin | G06F 8/41 |
| | | | | 717/149 |
| 2018/0116620 | A1 * | 5/2018 | Chen | G06T 7/136 |
| 2018/0293463 | A1 * | 10/2018 | Brown | G06F 3/0482 |
| 2019/0180143 | A1 * | 6/2019 | Lyu | G06T 1/20 |

OTHER PUBLICATIONS https://docs.nvidia.com/cuda/parallel-thread-execution/index.html.
https://github_com/NVIDIA/cutlass/blob/master/media/docs/efficient_gemm.md.

* cited by examiner

*Primary Examiner* — Ming Wu
(74) *Attorney, Agent, or Firm* — WPAT, P.C.; Anthony King

(57) ABSTRACT

The present application discloses a warp execution method used for SPs of an SM of a GPU and an associated GPU. The SPs share a scratchpad memory, and the warp execution method includes: when the predetermined time point for warp-loading is reached, checking a first indicator to obtain a size of a space with the status of blank in the scratchpad memory, to determining whether to load the warp, wherein the first indicator is used to indicate a starting position of a space with the status of data-in-use and an ending position of the space with the status of blank; and when the predetermined time point for computing is reached, checking a second indicator and a third indicator to obtain a size of a space with the status of data-not-in-use in the scratchpad memory, to determining whether to compute the warp.

20 Claims, 17 Drawing Sheets

WARP EXECUTION METHOD AND ASSOCIATED GPU

CROSS-REFERENCE TO RELATED APPLICATIONS

This application claims priority to China Application Serial Number 202210627993.X, filed on Jun. 6, 2022, which is incorporated by reference in its entirety.

TECHNICAL FIELD

The present application relates to a warp and particularly to a warp execution method and an associated GPU.

BACKGROUND

When a GPU executes kernel code, it executes on a streaming processor (SP) with a warp as the unit. During the process, a scratchpad memory is used to temporarily store the data needed for the computation. The scratchpad memory is shared by multiple SPs, therefore the limited space of the scratchpad memory is one of the bottlenecks in the number of warps that can be scheduled to SPs, which is an urgent issue to be addressed in the related field.

SUMMARY

One purpose of the present disclosure is to disclose a warp execution method and an associated GPU to address the above-mentioned issues.

One embodiment of the present disclosure discloses a warp execution method for use in a plurality of streaming processors (SPs) of a streaming multiprocessor (SM) of a GPU; the plurality of SPs share a scratchpad memory, wherein a space status of the scratchpad memory is one of blank, data-in-use, data-not-in-use and data-loading, and the method includes: checking a first indicator to obtain a size of a space with the status of blank in the scratchpad memory to determine whether to load a warp when a predetermined time point for warp-loading is reached, wherein the first indicator is configured to indicate a starting position of a space with the status of data-in-use and an ending position of the space with the status of blank in the scratchpad memory, and checking a second indicator and a third indicator to obtain a size of a space with the status of data-not-in-use in the scratchpad memory to determine whether to compute the warp when a predetermined time point for computing is reached, wherein the second indicator is configured to indicate an ending position of the space with the status of data-not-in-use and a starting position of a space with the status of data-loading in the scratchpad memory, and the third indicator is configured to indicate the ending position of the space having the status of data-in-use and a starting position of the space with the status of data-not-in-use in the scratchpad memory.

One embodiment of the present disclosure discloses a GPU, wherein the GPU includes a streaming multiprocessor, including a streaming processor, configured to execute the foregoing method and a scratchpad memory.

One embodiment of the present disclosure discloses a warp execution method for use in a plurality of streaming processors (SPs) of a streaming multiprocessor (SM) of a GPU; the plurality of SPs share scratchpad memory, wherein a space status of the scratchpad memory is one of blank, data-in-use, data-not-in-use and data-loading, the method comprising: checking a second indicator and a third indicator to obtain a size of a space with the status of data-not-in-use in the scratchpad memory, when receiving a data arrival notification from a load/store engine, to determine whether to compute the warp, wherein the second indicator is configured to indicate an ending position of the space with the status of data-not-in-use and a starting position of a space with the status of data-loading in the scratchpad memory, and the third indicator is configured to indicate an ending position of a space having a status of data-in-use and a starting position of the space with the status of data-not-in-use in the scratchpad memory; and sending a consume command to the load/store engine when it is determined to compute the warp.

One embodiment of the present disclosure discloses a GPU, wherein the GPU includes a streaming multiprocessor, including a streaming processor, configured to execute the foregoing method; a scratchpad memory; and a load/store engine.

The warp execution method and associated GPU disclosed in the present application can optimize the space usage of the scratchpad memory and thus increase the performance of the GPU.

DETAILED DESCRIPTION

Figure 1:
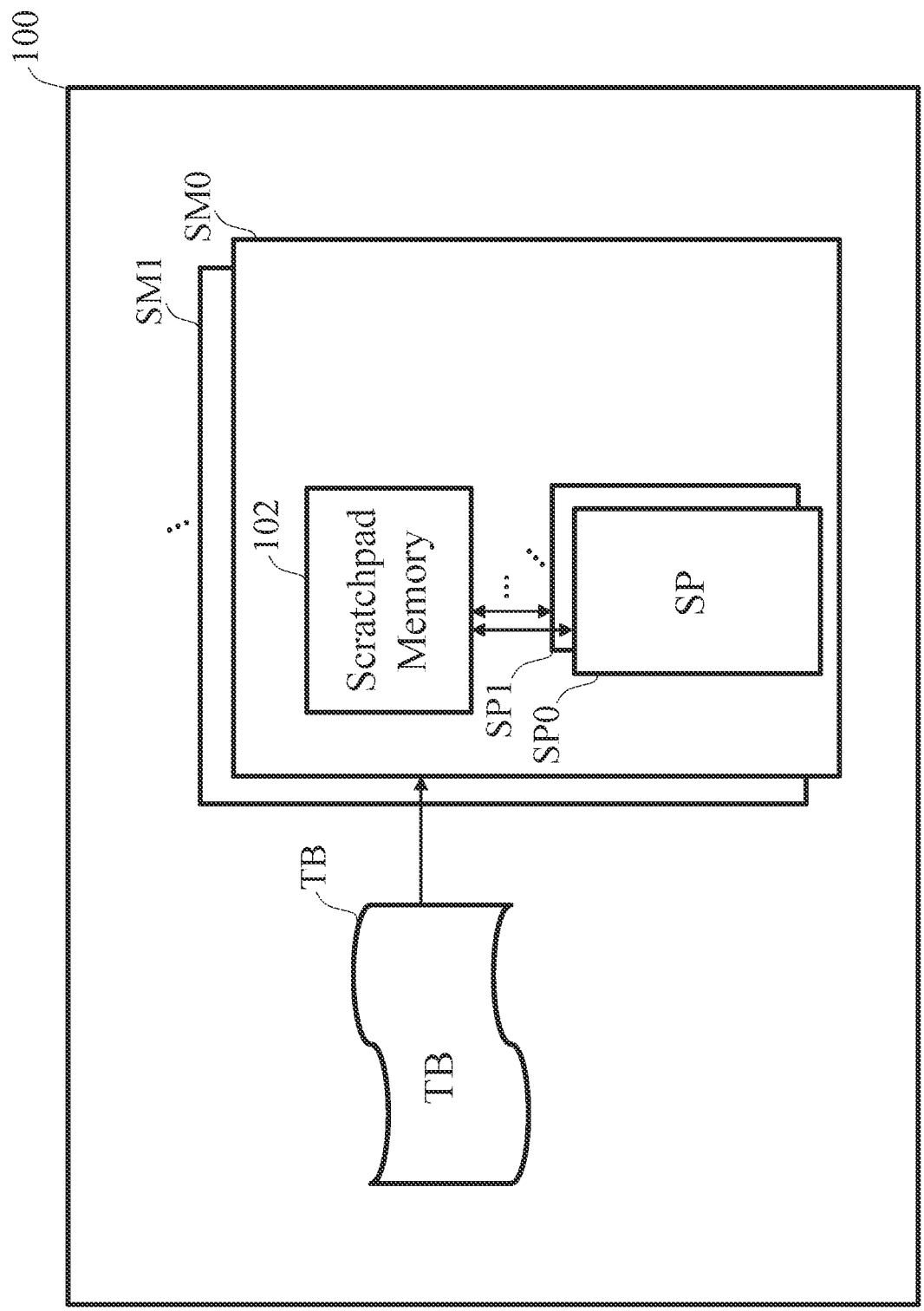
FIG. 1 is a schematic diagram illustrating a GPU according to first embodiment of the present disclosure.

The following disclosure provides many different embodiments or examples for implementing different features of the present disclosure. Specific examples of components and arrangements are described below to simplify the present disclosure. As could be appreciated, these are merely examples and are not intended to be limiting. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals and/or letters in the various embodiments. This repetition is for the purpose of simplicity and clarity and does not in itself dictate a relationship between the various embodiments and/or configurations discussed.

Further, spatially relative terms, such as "beneath," "below," "lower," "above," "upper," and the like, may be used herein for ease of description to discuss one element or feature's relationship to another element(s) or feature(s) as illustrated in the drawings. These spatially relative terms are intended to encompass different orientations of the device in use or operation in addition to the orientation depicted in the drawings. The apparatus may be otherwise oriented (e.g., rotated by 90 degrees or at other orientations), and the spatially relative descriptors used herein may likewise be interpreted accordingly.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in the respective testing measurements. Also, as used herein, the term "the same" generally means within 10%, 5%, 1%, or 0.5% of a given value or range. Alternatively, the term "the same" means within an acceptable standard error of the mean when considered by one of ordinary skill in the art. As could be appreciated, other than in the operating/working examples, or unless otherwise expressly specified, all of the numerical ranges, amounts, values, and percentages (such as those for quantities of materials, duration of times, temperatures, operating conditions, portions of amounts, and the likes) disclosed herein should be understood as modified in all instances by the term "the same." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Here, ranges can be expressed as from one endpoint to another endpoint or between two endpoints. All ranges disclosed herein are inclusive of the endpoints, unless specified otherwise.

FIG. 1 is a schematic diagram illustrating a GPU according to first embodiment of the present disclosure. The GPU 100 includes a plurality streaming multiprocessors (SMs) SM0, SM1, . . . , wherein each of the plurality of streaming multiprocessors SM0, SM1, . . . includes a plurality of streaming processors (SPs) SP0, SP1, . . . and a scratchpad memory 102, wherein the scratchpad memory 102 is also known as a shared memory. The GPU 100 is configured to receive and execute a thread block TB, wherein the thread block TB includes a plurality of warps WP. The GPU 100 schedules the thread block TB to one of the plurality of streaming multiprocessors SM0, SM1, . . . . For example, as shown in FIG. 1, the thread block TB is scheduled to the streaming multiprocessor SM0, and the plurality of warps of the thread block TB are scheduled to the plurality of streaming processors SP0, SP1, . . . in the streaming multiprocessor SM0.

In the present embodiment, the types of warps include a computing warp and a loading warp. The execution of the computing warp causes the GPU 100 to execute the operation of "computation;" the execution of the loading warp causes the GPU 100 to execute the operation of "load/store." For each SM, the plurality of streaming processors SP0, SP1, . . . therein often needs to retrieve data from the global memory and temporarily load it to the scratchpad memory 102 for computing when executing a warp. Since the scratchpad memory 102 is shared by the plurality of streaming processors SP0, SP1, . . . , and the space in the scratchpad memory 102 is limited, it becomes a bottleneck for the GPU 100 when executing the warp. The warp execution method disclosed in the present application can optimize the usage efficiency of the scratchpad memory and thus increase the overall performance for the GPU when executing the warp, the details of which are described below.

Figure 2:
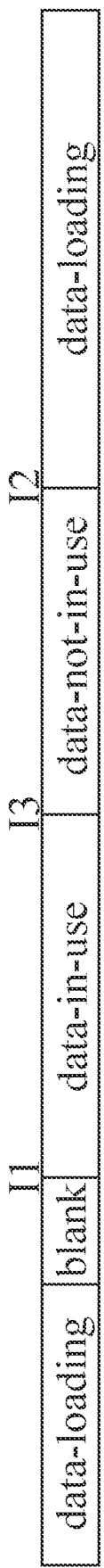
FIG. 2 is a schematic diagram illustrating a scratchpad memory according to one embodiment of the present disclosure.

FIG. 2 is a schematic diagram illustrating a scratchpad memory 102 according to one embodiment of the present disclosure. For the convenience of subsequent descriptions, the scratchpad memory 102 shows the allocation of its storage space in a bar shape in FIG. 2. In the present embodiment, the scratchpad memory 102 is used from left to right, and when it reaches the far right end, it will return to the far left to continue using. The space in the scratchpad memory 102 can have four different statuses: blank, data-in-use, data-not-in-use and data-loading. "Blank" means that the space is flush and data can be loaded; "data-in-use" means that the space has data and is being used for computation; "data-not-in-use" means that the space has data and has not yet been used is used to perform computation; "data-loading" means that the space is expected to hold data, but the data has not yet reached the space from the global memory.

The first indicator I1 is used to indicate the ending position of the area with a status of blank and the starting position of the area with a status of data-in-use. For example, the first indicator I1 is specifically the end address of the area with a status of blank, and since the head address of the area with a status of data-in-use follows the end address of the area with a status of blank, the head address of the area with a status of data-in-use can also be known from the first indicator I1. As could be appreciated, the first indicator I1 can also be the head address of the region with the status of data-in-use.

The second indicator I2 is used to indicate the ending position of the area with a status of data-not-in-use and the starting position of the area with a status of data-loading. For example, the second indicator I2 is specifically the end address of the area with a status of data-not-in-use or the head address of the region with the status of data-loading.

The third indicator I3 is used to indicate the ending position of the area with a status of data-in-use and the starting position of the area with a status of data-not-in-use. For example, the third indicator I3 is specifically the end address of the area with a status of data-in-use or the head address of the region with the status of data-not-in-use.

For ease of discussion, the first embodiment of the warp execution method of the present disclosure is divided into four flow charts and illustrated in FIGS. 3, 5, 7, and 9, respectively. FIGS. 4, 6, 8 and 10 are used to assist the discussion of the illustration of FIGS. 3, 5, 7, and 9. In the first embodiment of the warp execution method of the present disclosure, the first indicator I1 and the second indicator I2 are stored in a specific predetermined area in the scratchpad memory 102. The third indicator I3 may be stored within or outside the scratchpad memory 102.

Figure 3:
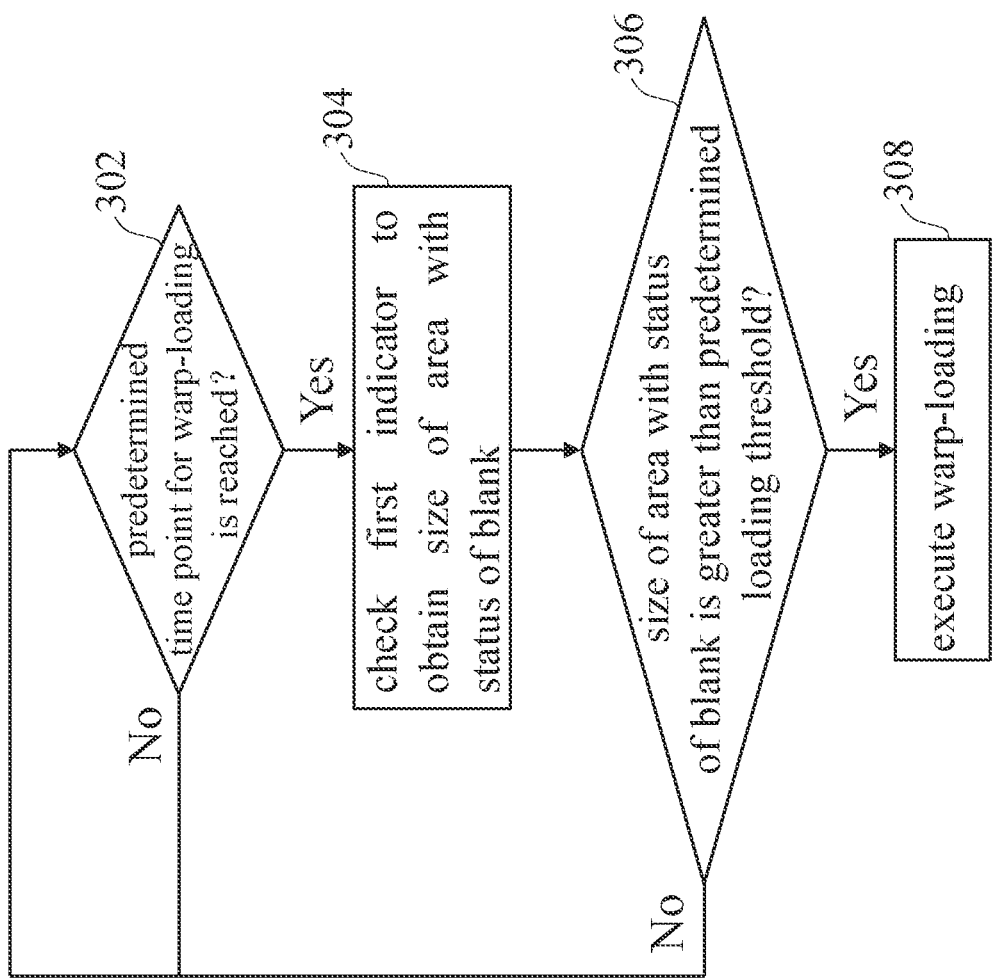
FIG. 3 is a schematic diagram illustrating a warp execution method according to a first part of the first embodiment of the present disclosure.

Specifically, the flowchart of FIG. 3 illustrates the process of the execution of the loading warp by each SP of the GPU 100 of FIG. 1. In Step 302, the SP determines whether a predetermined time point for warp-loading has been reached, which may, for example, be a time point occurs based on a fixed period. In certain embodiments, determining whether the predetermined time point for warp-loading has been reached may also be performed by a scheduler in the SM of GPU 100.

If it is determined that the predetermined time point for warp-loading has not yet reached, then the process stays in Step 302, until the predetermined time point for warp-loading is reached and then enters Step 304. In Step 304, the SP will check the first indicator I1 to obtain an ending position of the blank space in the scratchpad memory 102. In the present embodiment, the SP will use an indicator other than the first indicator I1, the second indicator I2 and the third indicator I3 to record and dynamically update the starting position of the area with the status of blank. Thus, for the SP, the starting position of the area with the status of blank is known. Therefore, after the SP checks the first indicator I1, it can then determine the overall size of the area with the status of blank according to the known starting position of the area with the status of blank.

Figure 4:
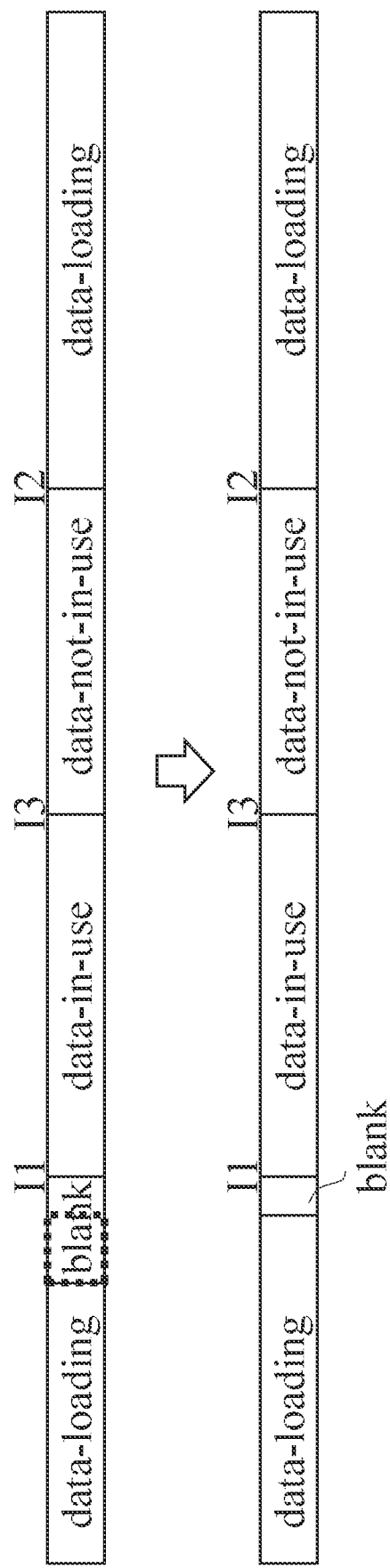
FIG. 4 is a schematic diagram for discussing the embodiment of FIG. 3.

In Step 306, the SP will determine whether the size of the area with the status of blank is greater than a predetermined loading threshold. As shown in FIG. 4, the dotted box represents the predetermined loading threshold; as illustrated in FIG. 4, the size of the area with the status of blank is greater than the predetermined loading threshold, thus the method proceeds to Step 308 and executes the warp-loading to load data, and the SP updates the starting position of the area with the status of blank. If, unlike the case as shown in FIG. 4, the size of the area with the status of blank is not greater than the predetermined loading threshold, then the method returns to Step 302.

In certain embodiments, if the method proceeds to Step 306 for several times in a row and is not able to enter Step 308, it means that the data in the scratchpad memory 102 cannot be processed timely, and the bottleneck is in the warp computation; thus, the predetermined time point for warp-loading can be delayed (i.e., the attempt to load the warp can be temporarily delayed), so as to reduce the waste of resources caused by repeated attempts.

In the present embodiment, when the loading warp is executed in Step 308, the whole data is not always loaded at one time; rather, it is divided into multiple loadings, and only part of the data is loaded each time. Therefore, the predetermined loading threshold represents the size of the data to be loaded next time. When being loaded in multiple times, the data is not necessarily equally divided into fixed sizes, and hence the predetermined loading threshold may not be fixed.

Figure 5:
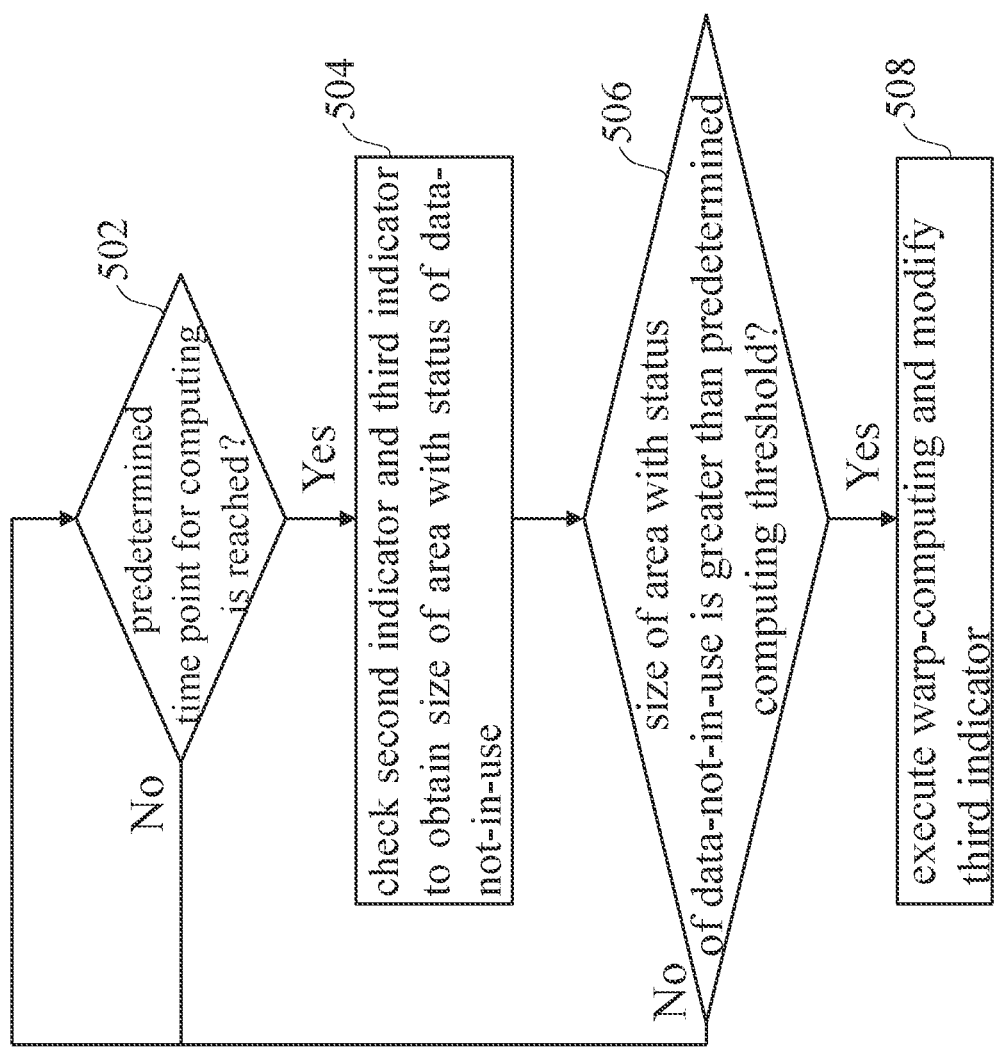
FIG. 5 is a schematic diagram illustrating a warp execution method according to a second part of the first embodiment of the present disclosure.

The flowchart of FIG. 5 illustrates the process of the execution of the computing warp by each SP of the GPU 100 of FIG. 1. In Step 502, the SP determines whether a predetermined time point for computing has been reached, which may, for example, be a time point occurs based on a fixed period. In certain embodiments, determining whether the predetermined time point for computing has been reached may also be performed by a scheduler in the SM of GPU 100.

Figure 6:
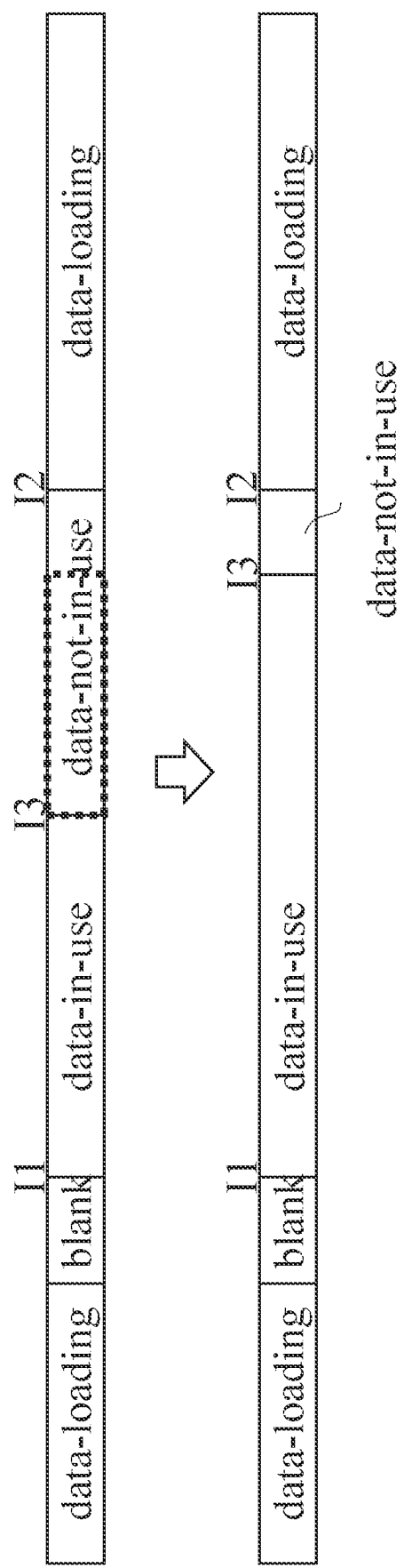
FIG. 6 is a schematic diagram for discussing the embodiment of FIG. 5.

If it is determined that the predetermined time point for computing has not yet reached, then the process stays in Step 502, until the predetermined time point for computing is reached and then enters Step 504. In Step 504, the SP will check the second indicator I2 and the third indicator I3 to obtain the size of an area with a status of data-not-in-use in the scratchpad memory 102. In Step 506, the SP will determine whether the size of the area with the status of data-not-in-use is greater than a predetermined computing threshold. As shown in FIG. 6, the dotted box represents the predetermined computing threshold; as illustrated in FIG. 6, the size of the area with the status of data-not-in-use is greater than the predetermined computing threshold, thus the method proceeds to Step 508 and computes the warp, and the SP modifies the third indicator I3 to indicate that the status of a portion of the area in the scratchpad memory 102 is changed from data-not-in-use to data-in-use. If, unlike the case as shown in FIG. 6, the size of the area with the status of data-not-in-use is not greater than the predetermined computing threshold, then the method returns to Step 502.

In certain embodiments, if the method proceeds to Step 506 for several times in a row and is not able to enter Step 508, it means that the data is not loaded in the scratchpad memory 102 fast enough, and the bottleneck is in the warp loading; thus, the predetermined time point for computing can be delayed (i.e., the attempt to compute the warp can be temporarily delayed), so as to reduce the waste of resources caused by repeated attempts.

In the present embodiment, when computing warp is executed in Step 508, it is not always necessary to wait for the whole data to arrive at the scratchpad memory 102 before starting to compute the warp; rather, the computation is divided into multiple operations, and only part of the data is computed each time. Therefore, the predetermined loading threshold represents the size of the data to be computed next time. When computing in multiple times, the data is not necessarily equally divided into fixed sizes, and hence the predetermined computing threshold may not be fixed.

Figure 7:
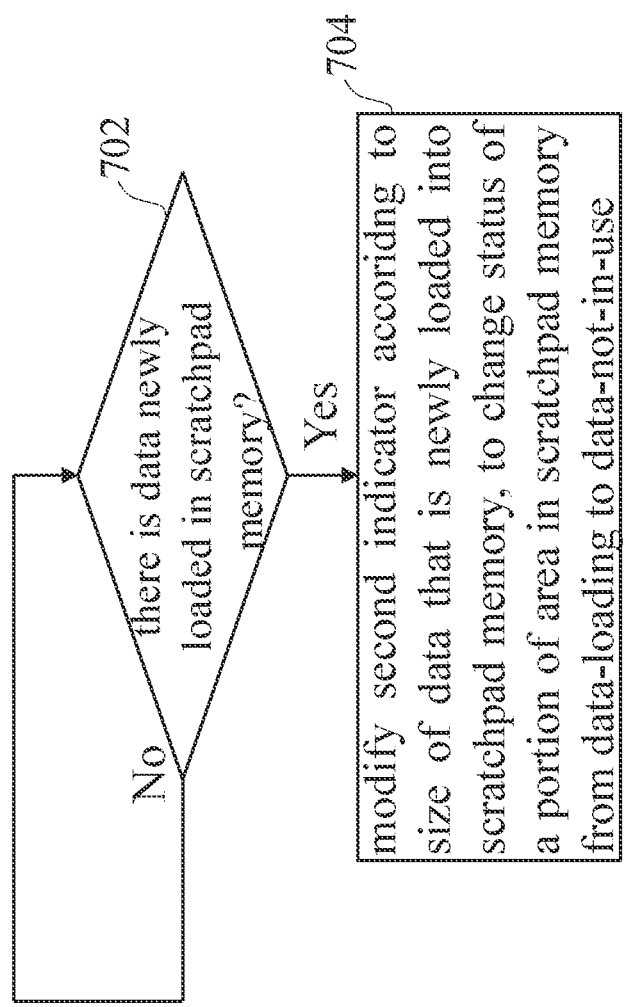
FIG. 7 is a schematic diagram illustrating a warp execution method according to a third part of the first embodiment of the present disclosure.

The flowchart of FIG. 7 illustrates the process of the execution of the loading warp by each SP of the GPU 100 of FIG. 1. In Step 702, the SP determines whether data is newly loaded in the scratchpad memory 102. For example, after loading the rap in Step 308, the data is read from the global memory and loaded into the scratchpad memory 102, in this case, the process of FIG. 7 proceeds from Step 702 to Step 704. If no data is newly loaded into the scratchpad memory 102, then the process stays in Step 702 until data is newly loaded into the scratchpad memory 102.

Figure 8:
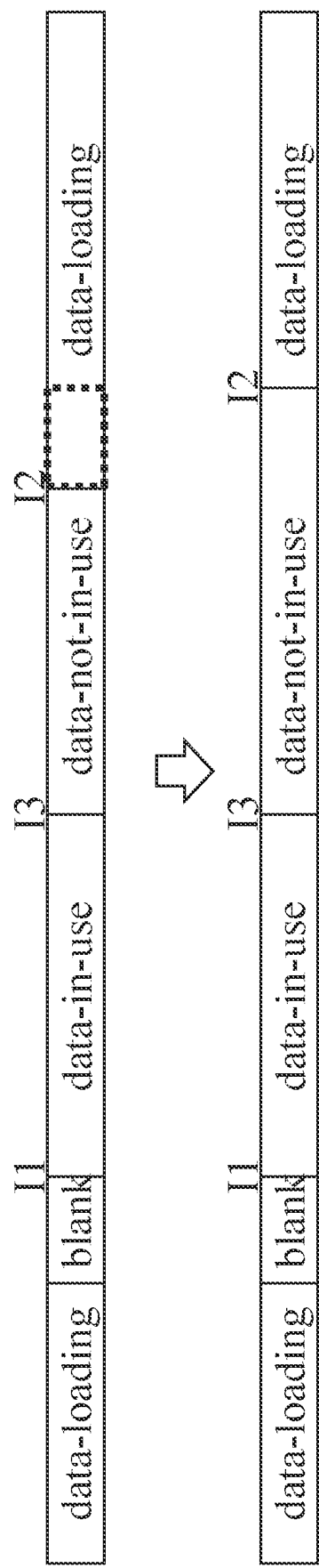
FIG. 8 is a schematic diagram for discussing the embodiment of FIG. 7.

In Step 704, the SP will modify the second indicator I2 according to the size of the data that is newly loaded into the scratchpad memory 102, to indicate that the status of a portion of the area in the scratchpad memory is changed from data-loading to data-not-in-use. As shown in FIG. 8, the dotted bot represents the data newly loaded into the scratchpad memory 102.

Figure 9:
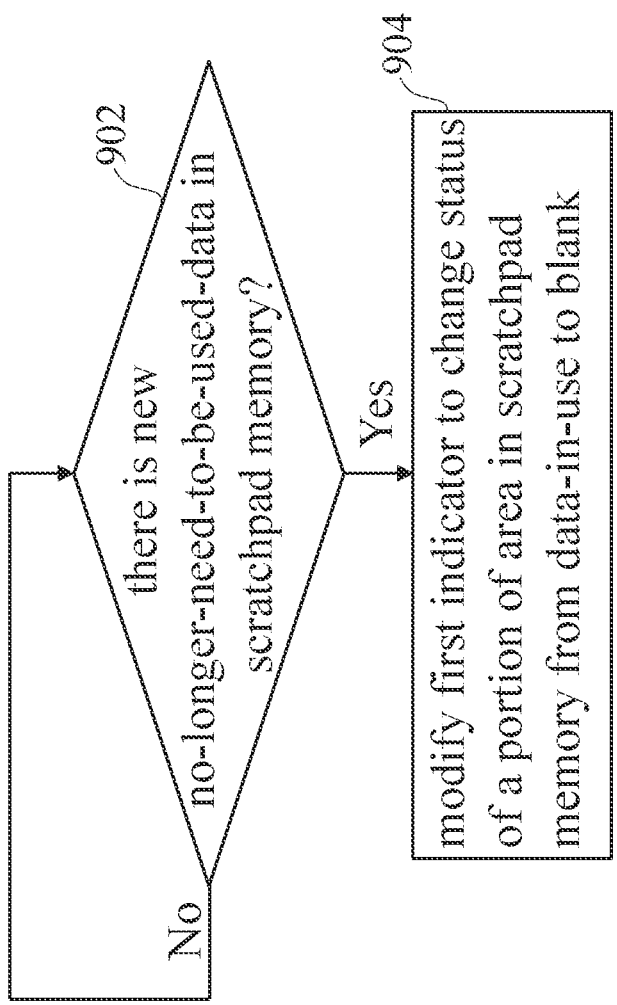
FIG. 9 is a schematic diagram illustrating a warp execution method according to a fourth part of the first embodiment of the present disclosure.
Figure 10:
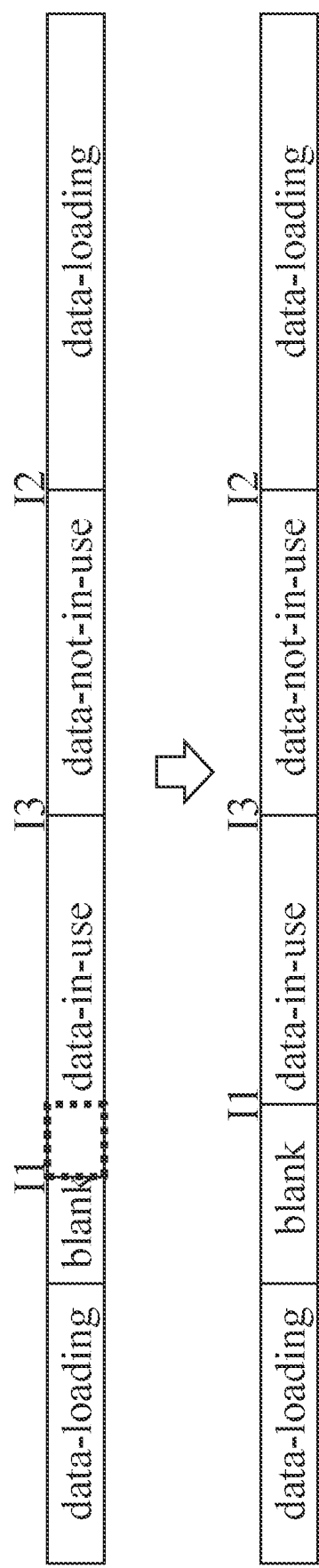
FIG. 10 is a schematic diagram for discussing the embodiment of FIG. 9.

The flowchart of FIG. 9 illustrates the process of the execution of the computing warp by each SP of the GPU 100 of FIG. 1. In Step 902, the SP determines whether there is any data in the scratchpad memory 102 that is newly determined to be no longer needed to be used. For example, after computing the warp in Step 508, the data in the scratchpad memory 102 will be used, and even if the computation of the warp has not been completed, there may be some data that have been determined not to be used again, such data is referred to as the data that is no longer needed to be used in Step 902. Whenever there is new no-longer-need-to-be-used-data, the process proceeds to Step 904 to modify the first indicator I1 to indicate that the status of a portion of the area in the scratchpad memory 102 is changed from data-in-use to blank, indicating that the space occupied by such data in the scratchpad memory 102 can be released. As shown in FIG. 10, the dotted boxes represent newly added data that no longer need to be used.

The embodiments provided in FIG. 3, FIG. 5, FIG. 7 and FIG. 9 can enable the GPU to further refine the loading warp and the computing warp when executing the warp, so that the scratchpad memory can be used more delicately, allowing the present application to increase the number of warps that the GPU can process per unit time without increasing the size of the scratchpad memory.

Figure 11:
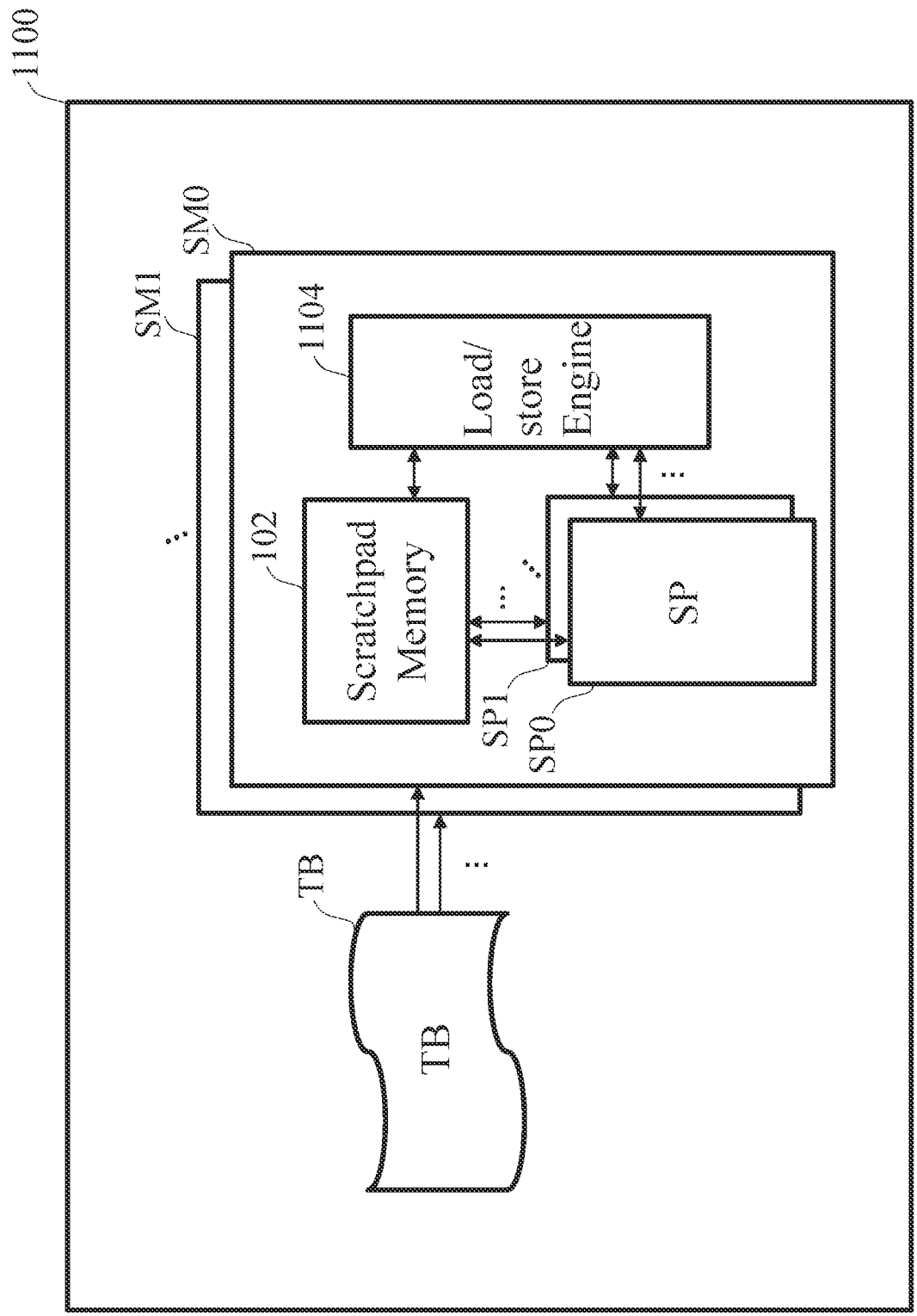
FIG. 11 is a schematic diagram illustrating a GPU according to a second embodiment of the present disclosure.

FIG. 11 is a schematic diagram illustrating a GPU according to a second embodiment of the present disclosure. The GPU 1100 differs from the GPU 100 in that each of the streaming multiprocessors SM0, SM1 of the GPU 1100 includes a load/store engine 1104 coupled to the SP SP0, SP1, . . . and the scratchpad memory 102. The load/store engine 1104 can be used to learn the global memory address of the corresponding data required to execute each warp in the thread block TB based on the primitive in the thread block TB, in place of the loading warp executed on the SP. In certain embodiments, the load/store engine 1104 may also be obtained by modifying the direct memory access engine (DMA engine).

For ease of discussion, the second embodiment of the warp execution method of the present disclosure is divided into five flow charts and illustrated in FIGS. 12, 13, 14, 15 and 16, respectively. In the second embodiment of the warp execution method of the present disclosure, the definition of the status of the scratchpad memory 102 and the definition of the first indicator I1, the second indicator I2 and the third indicator I3 are the same as the first embodiment. However, in the present embodiment, the first indicator I1 and the second indicator I2 are stored in the load/store engine 1104. The third indicator I3 can be stored in or outside of the load/store engine 1104.

Figure 12:
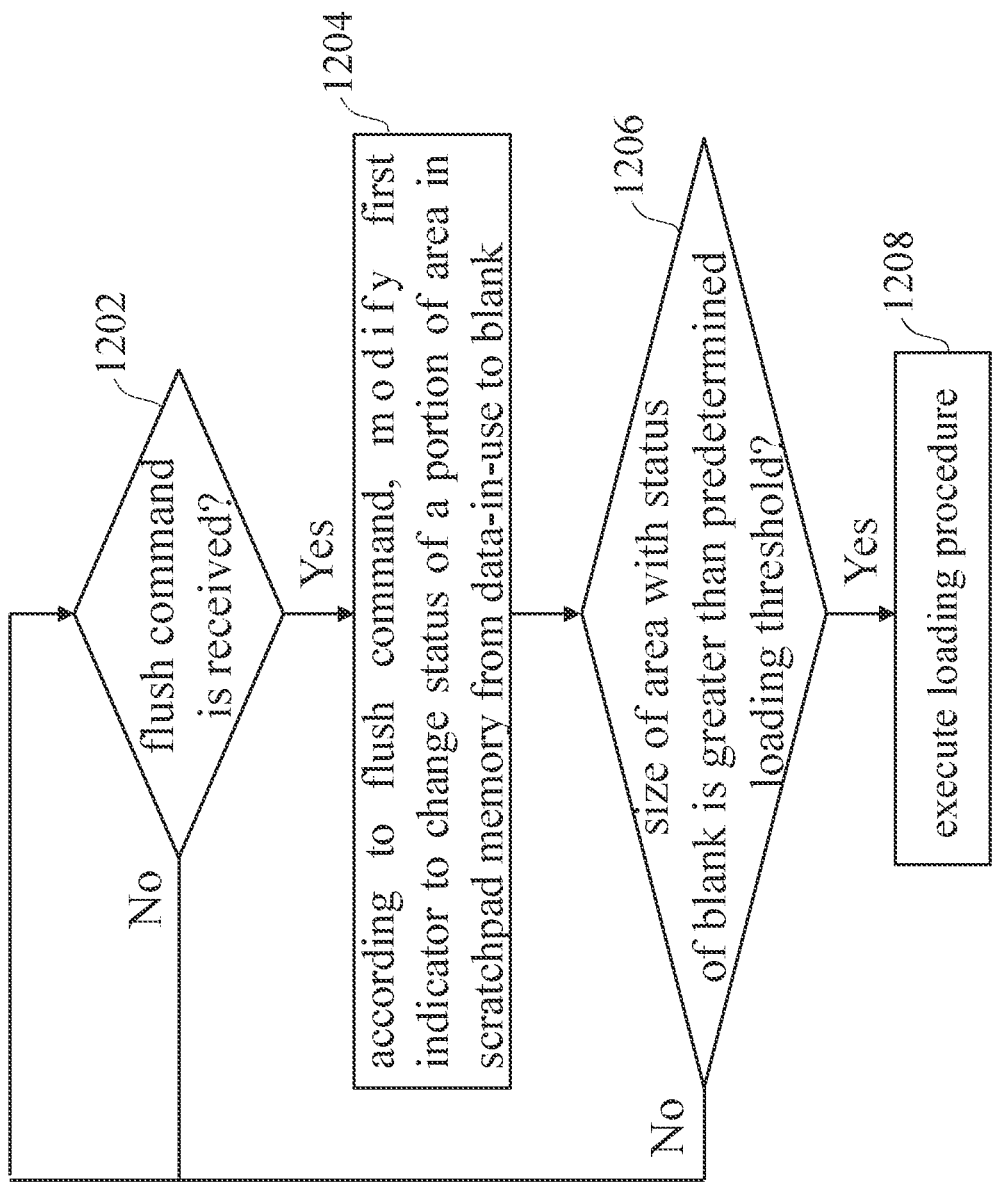
FIG. 12 is a schematic diagram illustrating a warp execution method according to a first part of the second embodiment of the present disclosure.

Specifically, the flowchart of FIG. 12 illustrates the process of the execution of the loading procedure by the load/store engine 1104 of the GPU 1100 of FIG. 11. In Step 1202, the load/store engine 1104 will determine whether a flush command is received, wherein the flush command is sent from the SP on the basis of the condition of the execution of computing warp and represents that a portion of the space in the scratchpad memory 102 can be released. The flush command can include the address information of the area in the scratchpad memory 102 that can be released, such as including a starting position and a length of the data that is no longer needed to be used, the details of which are described in FIG. 15.

If it is determined that the flush command is not yet received, then the process stays in Step 1202 until the flush command is received, and then proceeds to Step 1204. In Step 1204, the load/store engine 1104 will modify the first indicator I1 according to the information contained in the flush command, which indicates that the status of a portion of the area in the scratchpad memory 102 is changed from data-in-use to blank, meanwhile, the first indicator I1 also indicates the ending position of the blank space in the scratchpad memory 102. In the present embodiment, starting position of the area with the status of blank is recorded by the load/store engine 1104 and is updated dynamically, and hence this information is known to the load/store engine 1104. Therefore, the load/store engine 1104 can obtain the overall size of the area with the status of blank by checking the first indicator I1 and according to the known starting position of the area with the status of blank.

In Step 1206, the load/store engine 1104 will determine whether the size of the area with the status of blank is greater than the predetermined loading threshold. As shown in FIG. 4, the dotted box represents the predetermined loading threshold; as illustrated in FIG. 4, the size of the area with the status of blank is greater than the predetermined loading threshold, therefore, the process proceeds to Step 1208 and the load/store engine 1104 will execute the loading procedure to load data, and the load/store engine 1104 further updates the starting position of the area with the status of blank. If, unlike the case as shown in FIG. 4, the size of the area with the status of blank is not greater than the predetermined loading threshold, then the method returns to Step 1202.

In the present embodiment, when the scratchpad memory 102 has space to be released, it will proactively notify the loading/storing engine 1104 directly through a flush command. Therefore, the embodiment of FIG. 12 is more efficient, compared with FIG. 3, in which it is required to check the first indicator I1 constantly at the predetermined time point for warp-loading.

In the present embodiment, when the loading procedure is executed in Step 1208, the whole data is not always loaded at one time; rather, it is divided into multiple loadings, and only part of the data is loaded each time. Therefore, the predetermined loading threshold represents the size of the data to be loaded next time. When being loaded in multiple times, the data is not necessarily equally divided into fixed sizes, and hence the predetermined loading threshold may not be fixed.

Figure 13:
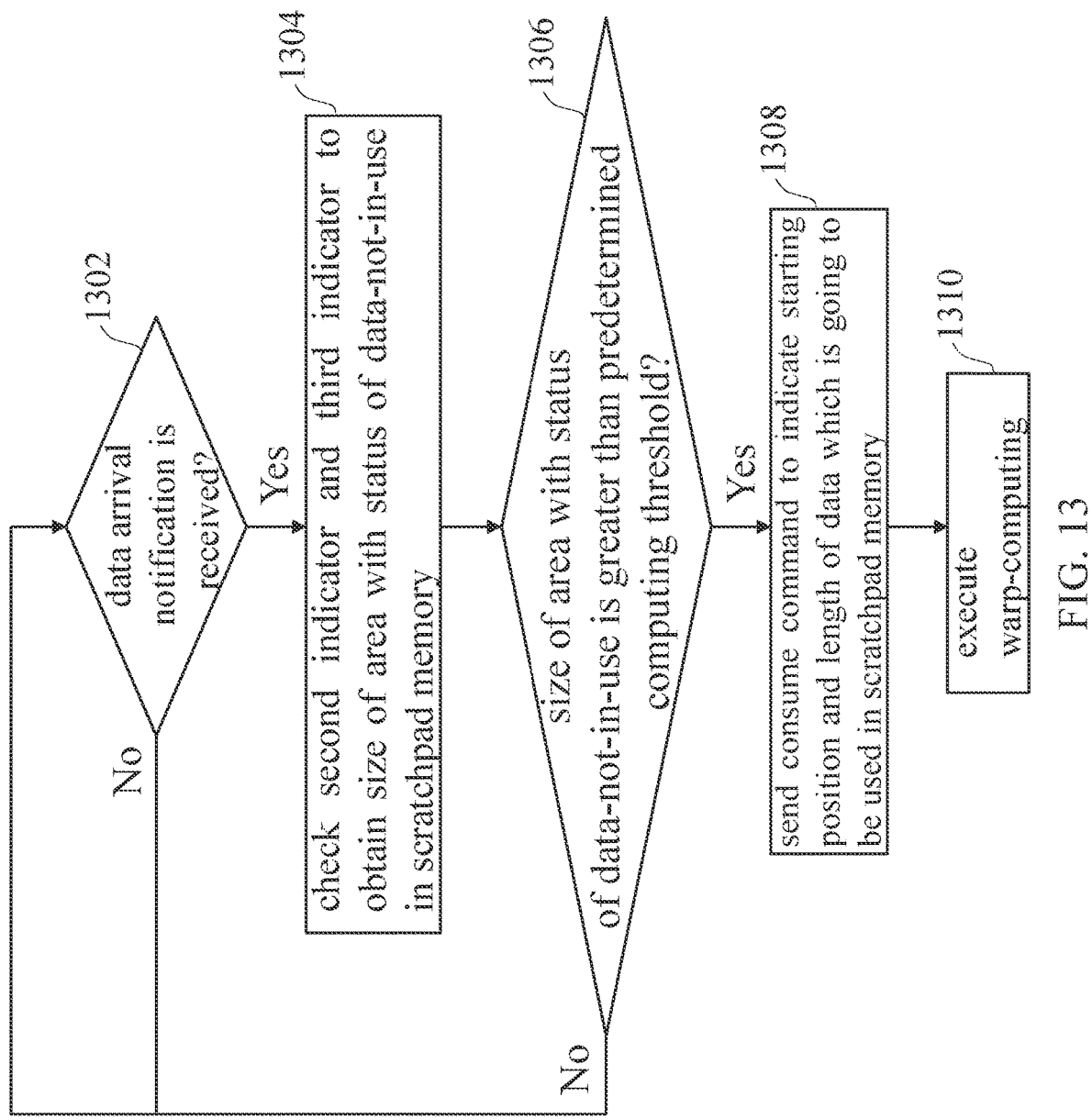
FIG. 13 is a schematic diagram illustrating a warp execution method according to a two part of the second embodiment of the present disclosure.

The flowchart of FIG. 13 illustrates the process of the execution of the computing warp by each SP of the GPU 1100 of FIG. 11. In Step 1302, the SP will determine whether a data arrival notification is received. In this case, the data arrival notification is sent from the load/store engine 1104 on the basis of the condition of the execution of the loading procedure and represents that there is data arrives at the scratchpad memory 102, the details of which are described in FIG. 15.

If it is determined that the data arrival notification is not yet received, then the process stays in Step 1302 until the data arrival notification is received, and then proceeds to Step 1304. In Step 1304, the SP will check the second indicator I2 and the third indicator I3 to obtain the size of the area in scratchpad memory 102 with the status of data-not-in-use. In Step 1306, the SP will determine whether the size of the area with the status of data-not-in-use is greater than the predetermined computing threshold. As shown in FIG. 6, the dotted box represents the predetermined computing threshold, as illustrated in FIG. 6, the size of the area with the status of data-not-in-use is greater than the predetermined computing threshold, indicating that the computing warp is going to executed, and the process proceeds to Step 1308, allowing the SP to send the consume command to the load/store engine 1104 as a notification. Then the process proceeds to Step 1310, allowing the SP to execute the computing warp. If the third indicator I3 is stored outside of the load/store engine 1104, the SP will modify the third indicator I3 to indicate that the status of part of the area in the scratchpad memory 102 is changed from data-not-in-use to data-in-use. If, unlike the case as shown in FIG. 6, the size of the area with the status of data-not-in-use is not greater than the predetermined computing threshold, then the method returns to Step 1302.

In the present embodiment, when there is new data arrives at the scratchpad memory 102, the load/store engine 1104 will proactively notify the SP directly through the data arrival notification, thereby improving the efficiency of the embodiment of FIG. 13, compared to FIG. 5, in which it is required to check the second indicator I2 and the third indicator I3 constantly at the predetermined time point for computing.

In the present embodiment, when the computing warp is executed in Step 1310, it is not always necessary to wait for the whole data to arrive at the scratchpad memory 102 before starting to compute the warp; rather, the computation is divided into multiple operations, and only part of the data is computed each time. Therefore, the predetermined loading threshold represents the size of the data to be computed next time. When computing in multiple times, the data is not necessarily equally divided into fixed sizes, and hence the predetermined computing threshold may not be fixed.

Figure 14:
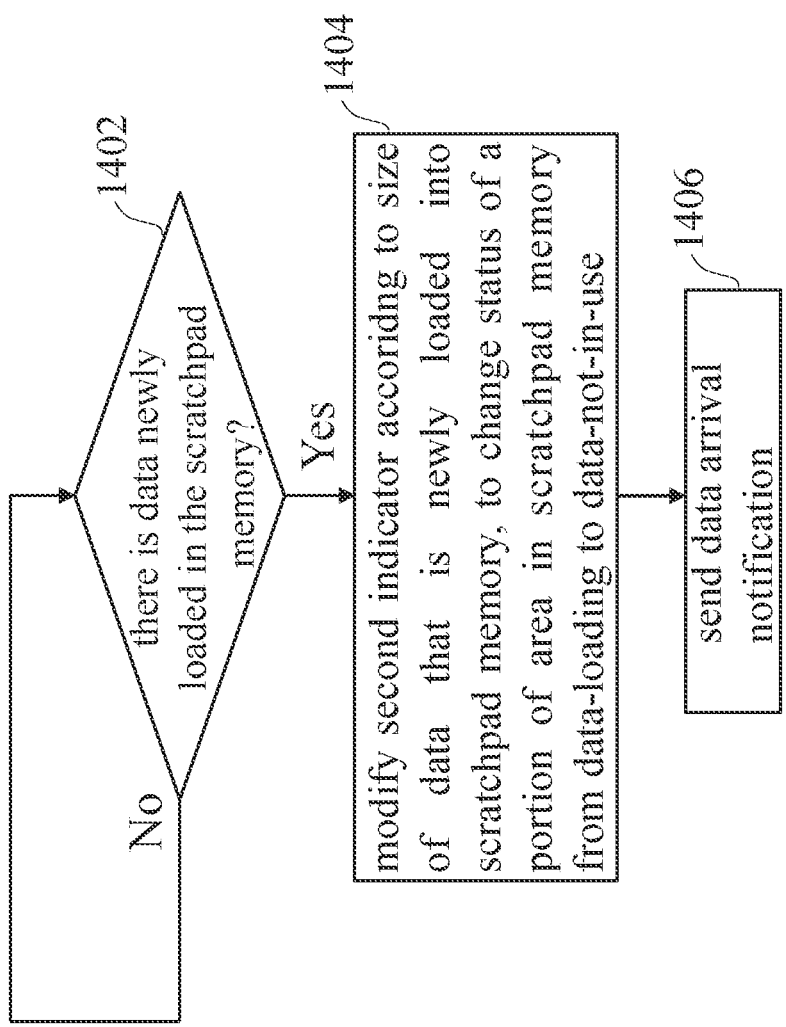
FIG. 14 is a schematic diagram illustrating a warp execution method according to a third part of the second embodiment of the present disclosure.

The flowchart of FIG. 14 illustrates the process of the execution of the loading warp by the load/store engine 1104 of the GPU 1100 of FIG. 11. In Step 1402, the load/store engine 1104 will determine whether a data is newly loaded into the scratchpad memory 102. For example, after Step 1208 performs the loading procedure, data will be read from the global memory and loaded into the scratchpad memory 102; in this case, the process of FIG. 14 proceeds from Step 1402 to Step 1404. If there is not data newly loaded into the scratchpad memory 102, the process will stay in Step 1402, until there is data newly loaded into the scratchpad memory 102.

In Step 1404, the load/store engine 1104 will modify the second indicator I2 according to the size of the data that is newly loaded into the scratchpad memory 102, to indicate that the status of part of the area in the scratchpad memory is changed from data-loading into data-not-in-use. As shown in FIG. 8, the dotted box represents the data newly loaded into the scratchpad memory 102. Next, the load/store engine 1104 will send the data arrival notification in Step 1406.

Figure 15:
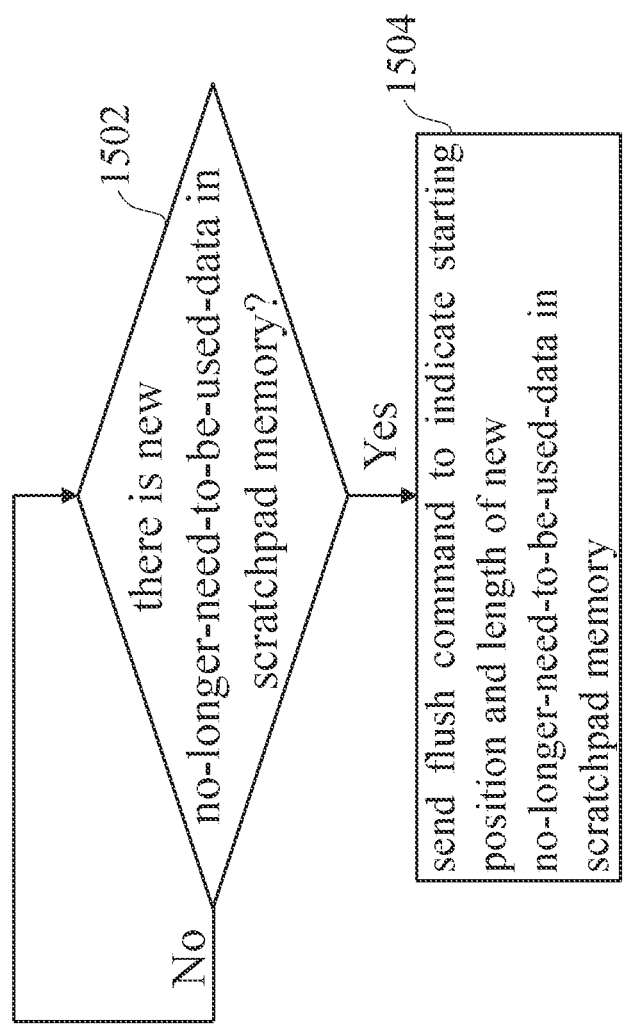
FIG. 15 is a schematic diagram illustrating a warp execution method according to a fourth part of the second embodiment of the present disclosure.

The flowchart of FIG. 15 illustrates the process of the execution of the computing warp by each SP of the GPU 1100 of FIG. 11. For example, when Step 1310 executes the computing warp, it will use the data in the scratchpad memory 102, and even if the computation of the warp has not been completed, there may be some data that have been determined not to be used again, such data is referred to as the data that is no longer needed to be used in Step 1502. Whenever there is data that newly determined to be no longer need to be used, the process proceeds to Step 1504 send the flush command to notify the load/store engine 1104 to modify the first indicator I1 to indicate that the status of part of the area in the scratchpad memory 102 is changed from data-in-use to blank, indicating that the space occupied by such data in the scratchpad memory 102 can be released. As shown in FIG. 10, the dotted boxes represent newly added data that no longer need to be used.

Figure 16:
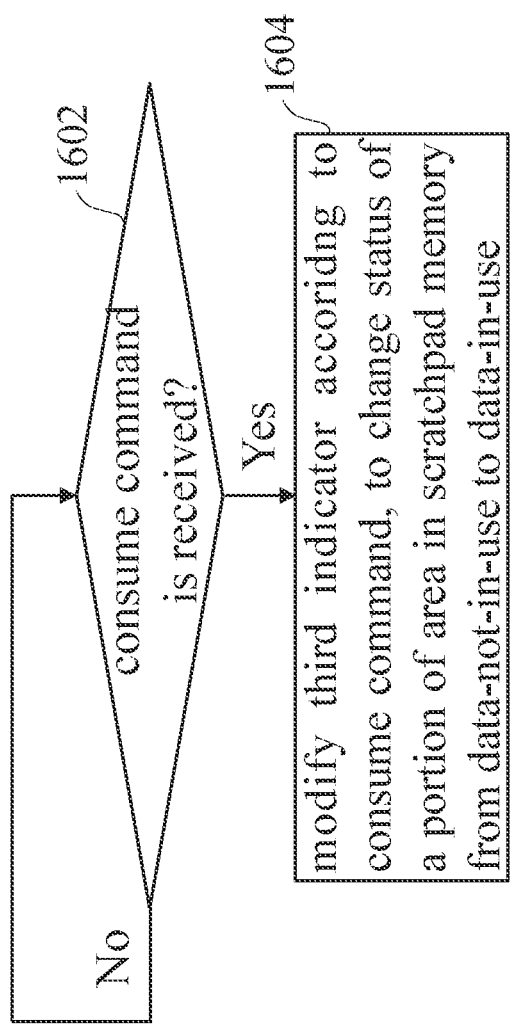
FIG. 16 is a schematic diagram illustrating a warp execution method according to a fifth part of the second embodiment of the present disclosure.

The flowchart of FIG. 16 illustrates the process of the execution of the loading warp by the load/store engine 1104 of the GPU 1100 of FIG. 11. In Step 1602, the load/store engine 1104 will determine whether consume command is received, wherein the consume command is sent from the SP on the basis of the condition of the execution of computing warp and represents that data in a portion of the space in about to be used in the execution of the computing warp, wherein the consume command can include a starting position and a length of the data in the scratchpad memory 102 expected to be used by the computing warp.

If it is determined that the consume command is not yet received, then the process stays in Step 1602 until the consume command is received, and then proceeds to Step 1604. In Step 1604, the load/store engine 1104 will modify the third indicator I3 according to the consume command, to change the status of part of the area in the scratchpad memory 102 from data-not-in-use to data-in-use.

Figure 17:
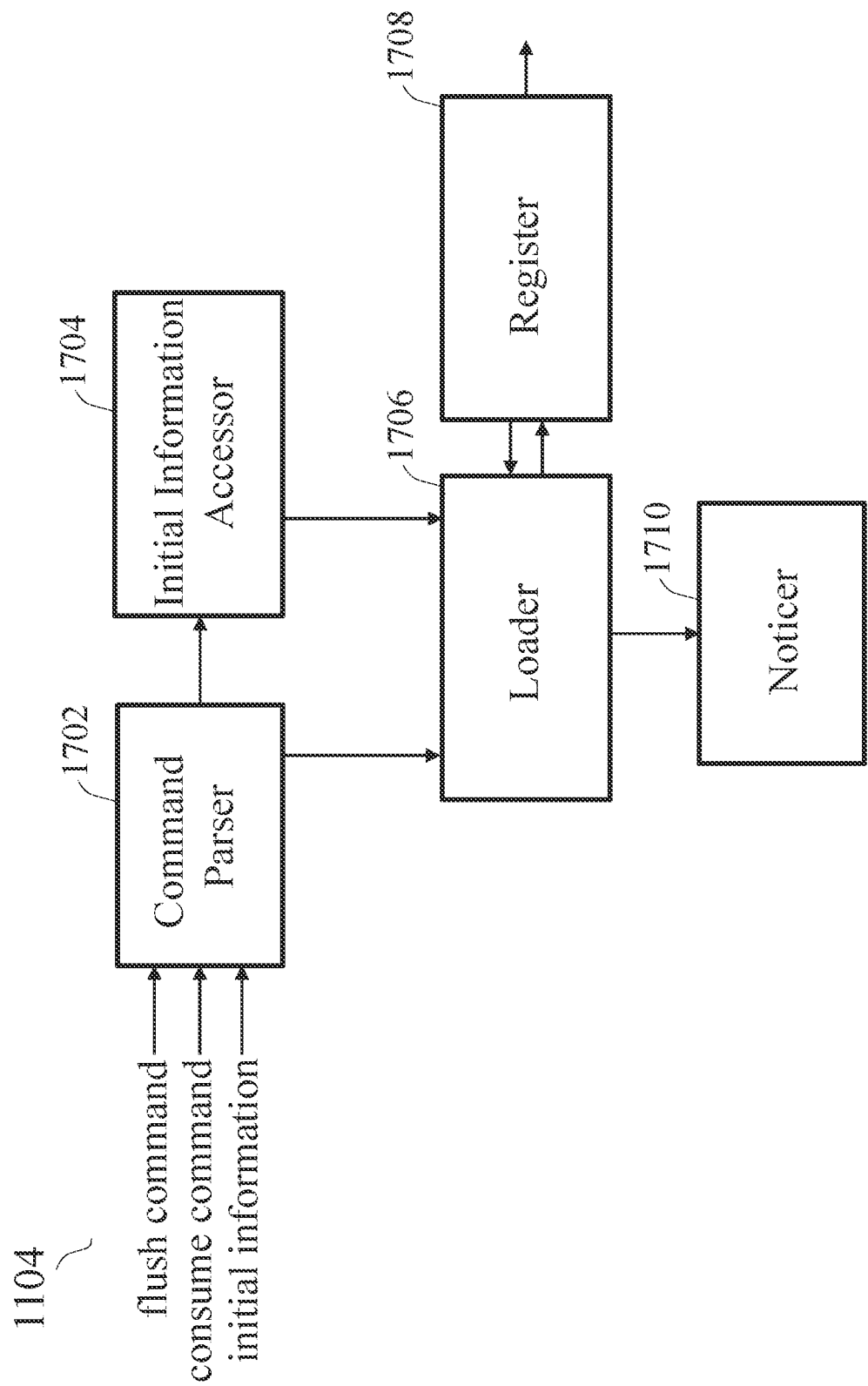
FIG. 17 is a schematic diagram illustrating a load/storage engine according to one embodiment of FIG. 11.

FIG. 17 is embodiment a schematic diagram illustrating the load/store engine 1104 of FIG. 11. The load/store engine 1104 includes a command parser 1702, an initial information accessor 1704, a loader 1706, a register 1708 and a noticer 1710. The register 1708 is configured to store the first indicator I1, the second indicator I2 and/or the third indicator I3. The command parser 1702 is configured to receive a flush command, a consume command and an initial information. The flush command and consume command have been discussed above. The initial information includes, such as, a thread block primitive. After the command parser 1702 analyzes the thread block primitives, it can know the information such as address in the global memory and the loading order of the data to be loaded corresponding to each warp in the execution thread block TB, and store the information in the command parser 1702.

The loader 1706 will execute the loading procedure according to the control of the command parser 1702 and initial information accessor 1704, and correspondingly modify the first indicator I1, the second indicator I2 and/or the third indicator I3 recorded in the register 1708. The first indicator I1 and the second indicator I2 can be read from the register 1708. The loader 1706 will further control the noticer 1710 to send the data arrival notification according to the condition of the loading procedure.

The embodiments provided in FIG. 12, FIG. 13, FIG. 14, FIG. 15 and FIG. 16 can further enhance the performance of the GPU in executing warps by proactively notifying the status change, thereby increasing the number of warps that the GPU can process per unit time.

The foregoing outlines features of several embodiments of the present application so that persons having ordinary skill in the art may better understand the various aspects of the present disclosure. Persons having ordinary skill in the art should appreciate that they may readily use the present disclosure as a basis for designing or modifying other processes and structures for carrying out the same purposes and/or achieving the same advantages of the embodiments introduced herein. Persons having ordinary skill in the art should also realize that such equivalent constructions do not depart from the spirit and scope of the present disclosure, and that they may make various changes, substitutions, and alternations herein without departing from the spirit and scope of the present disclosure.

What is claimed is:

1. A warp execution method for use in a plurality of streaming processors (SPs) of a streaming multiprocessor (SM) of a GPU, characterized in that, the plurality of SPs share a scratchpad memory, wherein a space status of the scratchpad memory is one of blank, data-in-use, data-not-in-use and data-loading, the method comprising:

checking a first indicator to obtain a size of a space with the status of blank in the scratchpad memory to determine whether to load a warp when a predetermined time point for warp-loading is reached, wherein the first indicator is configured to indicate a starting position of a space with the status of data-in-use and an ending position of the space with the status of blank in the scratchpad memory; and checking a second indicator and a third indicator to obtain a size of a space with the status of data-not-in-use in the scratchpad memory to determine whether to compute the warp when a predetermined time point for computing is reached, wherein the second indicator is configured to indicate an ending position of the space with the status of data-not-in-use and a starting position of a space with the status of data-loading in the scratchpad memory, and the third indicator is configured to indicate the ending position of the space having the status of data-in-use and a starting position of the space with the status of data-not-in-use in the scratchpad memory.

2. The method of claim 1, characterized in that, the step of determining whether to perform the step of loading the warp comprises:
loading the warp when the size of the space with the status of blank in the scratchpad memory is greater than a predetermined loading threshold.

3. The method of claim 1, characterized in that, the step of determining whether to perform the step of computing the warp comprises:
computing the warp when the size of the space with the status of data-not-in-use in the scratchpad memory is greater than a predetermined computing threshold, and modifying the third indicator to indicate that the status of a portion of the space in the scratchpad memory is changed from data-not-in-use to data-in-use.

4. The method of claim 1, characterized in further comprising:
when data are newly loaded into the scratchpad memory, modifying the second indicator according to a size of the newly loaded data to indicate that the status of a portion of the space in the scratchpad memory is changed from data-loading to data-not-in-use.

5. The method of claim 1, characterized in further comprising:
when the computation of the warp is only partially executed and it is determined that there is data in the scratchpad memory that is no longer needed to be used, modifying the first indicator to indicate that the status of a portion of the space in the scratchpad memory is changed from data-in-use to blank.

6. The method of claim 1, characterized in that, the first indicator and the second indicator are stored in the scratchpad memory.

7. The method of claim 1, characterized in that, the third indicator is stored in the scratchpad memory or outside of the scratchpad memory.

8. A GPU, characterized in that, the GPU comprises:
a streaming multiprocessor (SM), comprising:
a streaming processor (SP), configured to execute a method according to claim 1; and
the scratchpad memory.

9. A warp execution method for use in a plurality of streaming processors (SPs) of a streaming multiprocessor (SM) of a GPU, characterized in that, the plurality of SPs share scratchpad memory, wherein a space status of the scratchpad memory is one of blank, data-in-use, data-not-in-use and data-loading, the method comprising:
checking a second indicator and a third indicator to obtain a size of a space with the status of data-not-in-use in the scratchpad memory, when receiving a data arrival notification from a load/store engine, to determine whether to compute the warp, wherein the second indicator is configured to indicate an ending position of the space with the status of data-not-in-use and a starting position of a space with the status of data-loading in the scratchpad memory, and the third indicator is configured to indicate an ending position of a space having a status of data-in-use and a starting position of the space with the status of data-not-in-use in the scratchpad memory; and
sending a consume command to the load/store engine when it is determined to compute the warp.

10. The method of claim 9, characterized in that, the step of determining whether to compute the warp comprises:
computing the warp when the size of the space with the status of data-not-in-use in the scratchpad memory is greater than a predetermined computing threshold.

11. The method of claim 9, characterized in that, the consume command comprises a starting position and a length of data in the scratchpad memory expected to be used when computing the warp, to control the load/store engine to modify the third indicator to indicate that the status of a portion of the space in the scratchpad memory is changed from data-not-in-use to data-in-use.

12. The method of claim 9, characterized in further comprising:
sending an flush command to the load/store engine when the computation of the warp is only partially executed and it is determined that there is data in the scratchpad memory that is no longer needed to be used.

13. The method of claim 12, characterized in that, the flush command comprises a starting position and a length of the data no longer needed to be used, to control the load/store engine to modify a first indicator to indicate that the status of a portion of the space in the scratchpad memory is changed from data-in-use to blank.

14. The method of claim 13, characterized in that, the load/store engine determining whether to perform a loading procedure according to the flush command.

15. The method of claim 14, characterized in that, when the size of the space with the status of blank in the scratchpad memory is greater than a predetermined loading threshold, the load/store engine executes the loading procedure.

16. The method of claim 9, characterized in that, when data are newly loaded into the scratchpad memory, the load/store engine modifies the second indicator according to a size of the newly loaded data to indicate that the status of a portion of the space in the scratchpad memory is changed from data-loading to data-not-in-use and sends the data arrival notification.

17. The method of claim 13, characterized in that, the first indicator is stored in the load/store engine.

18. The method of claim 9, characterized in that, the second indicator is stored in the load/store engine.

19. The method of claim 9, characterized in that, the third indicator is stored in the load/store engine or outside of the load/store engine.

20. A GPU, characterized in that, the GPU comprises:
a streaming multiprocessor (SM), comprising:
a streaming processor (SP), configured to execute a method according to claim 9;
the scratchpad memory; and
the load/store engine.

* * * * *